June 10, 1941.   P. DANIELSSON   2,245,330
METHOD OF AND DEVICE FOR DRESSING FISH
Filed Nov. 14, 1938   3 Sheets-Sheet 1

Inventor.
Paul Danielsson.
By Sommerville Young Attys

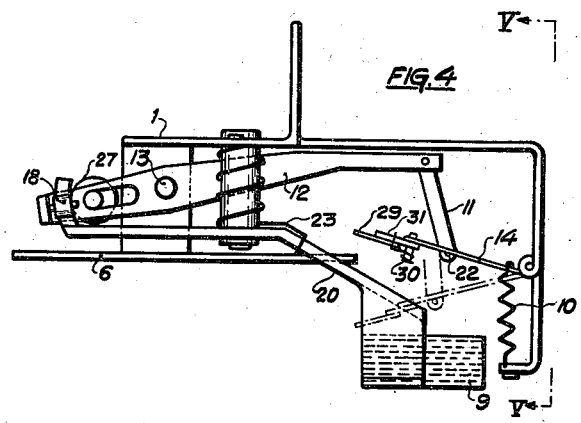
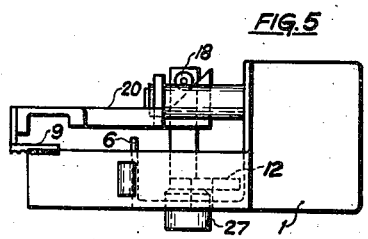
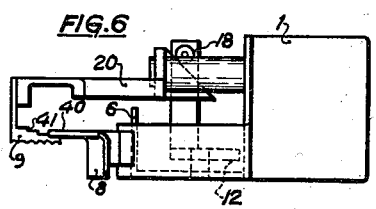

June 10, 1941.　　　P. DANIELSSON　　　2,245,330
METHOD OF AND DEVICE FOR DRESSING FISH
Filed Nov. 14, 1938　　　3 Sheets-Sheet 3

Inventor
Paul Danielsson
By Sommers & Young
Attorneys

Patented June 10, 1941

2,245,330

UNITED STATES PATENT OFFICE 2,245,330

METHOD OF AND DEVICE FOR DRESSING FISH

Paul Danielsson, Stockholm, Sweden, assignor to Aktiebolaget Gerh. Arehns Mekaniska Verkstad, Stockholm, Sweden, a joint-stock company of Sweden Application November 14, 1938, Serial No. 240,362
In Sweden August 10, 1937

19 Claims. (Cl. 17—4)

This invention relates to a method of and device for dressing fish and it is an object of the invention to facilitate eviscerating or other dressing of fish so that the dressing means, independently of the variations of size of the fish, will always be operative in the most suitable position relative to the fish's head end, whereby the loss of valuable parts of the fish will be reduced to a minimum. For the purpose of completely or partially decapitating fish, for instance, the fish and the decapitating cutter may be adjusted relatively to one another in such manner that loss of meaty parts of the head end of the fish will be as little as possible. Moreover, the fish may not be decapitated too close to its head end, for then it may occur that parts of its coronal bone remain in the body of the fish and subsequent eviscerating will be rendered difficult. Thus it is desirable that the cut be applied to the fish at a certain distance from its head end. Merely to cause the head end of the fish to engage a stationary abutment is not sufficient, as the size of fish caught in the same draught may be very variable, particularly in draughts of herrings. Nor will an adjustment depending on the entire length of the fish satisfy, as it is difficult to correctly determine said length. As distinguished from such imperfect adjustment, according to the present invention the fact that the shape of the heads of such fishes is rather uniform is utilized for determining the adjustment of the relative position of the cutter and fish. Due to their ample presence in draughts and small resistance against vitiation they should be eviscerated as promptly as possible, which requires as a practical matter that they be freed from their viscera mechanically. The length of the head of herrings, for instance from their gills, is about three times the thickness of the fish at their gills. This as well as the matter of fact that the fish at their gills are relatively hard or compact is utilized when employing the method and means according to the present invention.

In the accompanying drawings are shown by way of example three constructions of the invention.

Fig. 4 is a plan view of another construction of the invention;

Fig. 5 is a view in the direction V—V of Fig. 4;

Fig. 6 shows still another construction, viewed in a direction opposite to the direction of movement of the conveyor.

Figure 1:
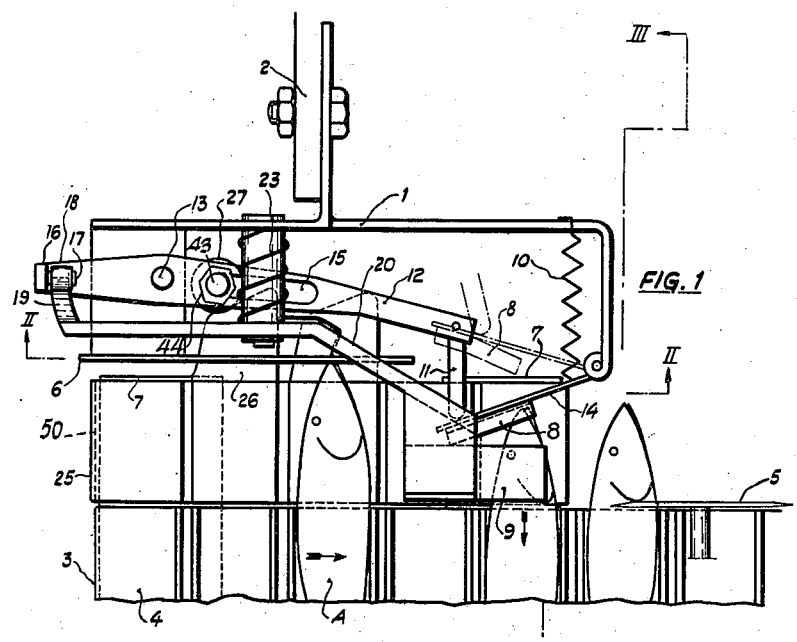
Fig. 1 is a plan view of part of a fish eviscerating machine provided with a device embodying the invention.
Figure 2:
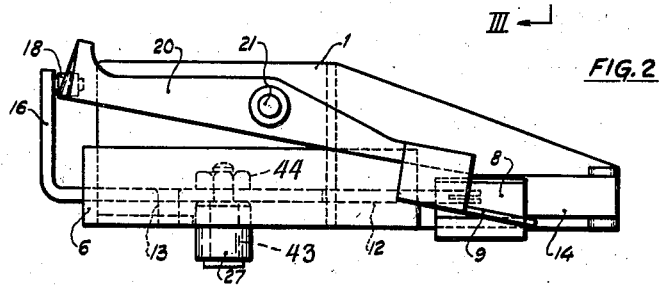
Fig. 2 is a view in the direction II—II of Fig. 1.
Figure 3:
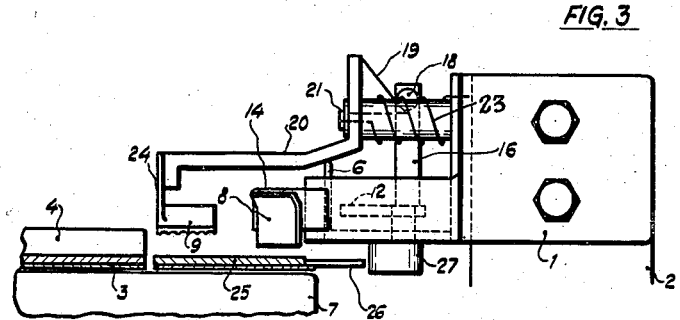
Fig. 3 is a view in the direction III—III of Fig. 1.

The device as shown in Figs. 1 to 3 has a bracket 1 secured to the machine frame 2 at one side of the fish conveyor 3. The fish A are automatically or manually placed in transverse pockets 4 of the conveyor, so that their heads are directed towards the side of the conveyor at which is positioned a rotary cutter 5 for completely or partly decapitating the fish in transit. The fish are displaced longitudinally within the pockets 4 until their heads hit a plate 6. Alternatively, the displacement may be performed until the heads striks some other abutment before the fish drop into the pockets 4, said other abutment being so located that their head ends will be positioned at a slight distance from the plate 6. The displacement as mentioned may be obtained by means of a jet of water projected from the rear onto the fish.

It is assumed, by way of example, that the conveyor 3 runs continuously over the pulley 7, so that the conveyor moves the fish transversely along the plate 6 and further into a position in front of a bent plate 8 which constitutes a member for longitudinal adjustment of the position of the fish. Simultaneously, the head of the fish is positioned below a plate 9 which constitutes a member for gaging the thickness of the fish. The plate 9 has at its lower side grooves extending in the direction of movement of the conveyor 3. The plates 8 and 9 are operably interconnected to obtain a desired relationship of movement, for example, the arrangement may be such that the plate 8 moves three times as fast as the plate 9. The plate 8 is secured to a lever 14 which is pivotally mounted on the bracket 1, and said plate is retracted from the conveyor 3 by a spring 10 until it is arrested by an abutment 11 adjustably mounted on a double armed lever 12. The lever 12 is pivoted on a pin 13 in the bracket 1. The rear, upwardly bent end 16 of the lever 12 has a pin 17 which is provided with a roller 18 loosely journalled thereon. The roller bears upon an oblique race 19 on the rear end of a double armed lever 20 which is pivotally mounted on a pin 21 secured in the bracket 1. A torsion spring 23 encloses the pin 21 and urges the forward arm of the lever 20 downward. To the lever 20 is secured a laterally projecting arm 24 which carries the plate 9 which is adjustable vertically on said arm. A relatively short endless belt 50 is arranged at the side of the conveyor 3 and adapted to run at the same velocity as the latter. The said belt 50 has plates 25 that constitute supports for the fish heads. Each of the plates 25 has a cam 26 adapted to coact with a roller 27 that is loosely journalled on a pin 43 at the lower side of the lever 12 and adjustable within the slot 15 of said lever. The pin 43 projects through the slot 15, and at its upper end it can be clamped to the lever by means of a nut 44.

When a fish A resting in a pocket 4 is moved by the conveyor 3 in the direction as indicated by the arrow (Fig. 1) a cam 26 will hit the roller 27. Then the roller as well as the arm 12 and abutment 11 are swung outwardly so that the spring 10 will swing the arm 14 together with the plate 8 outwardly from the conveyor into the position indicated in dash and dot lines in Fig. 1. Thereafter the fish is moved so that its head is brought into a position in front of the plate 8. Thereby the roller 27 rides on the rear part of the cam 26 so that the lever 12 can by means of the abutment 11 move the arm 14 and plate 8 inwardly towards the conveyor. This is performed by the rear bevelled end of the lever 20 which is caused by the spring 23 to urge the roller 18 outwardly. Thereby the plate 8 hits the head end of the fish and displaces the fish longitudinally within the pocket as indicated by the arrow in Fig. 1. When the descending plate 9 has been brought to rest upon the thickest hard portion of the fish head the spring 23 cannot swing the lever 20 further, nor the lever 12.

Therefore, the plate 8 has now occupied a position defined by the position of the plate 9, i. e. by the thickness of the fish head. The plates 8 and 9 are adjusted so that their relative positions are accommodated to the kind of fish to be dressed. In one and the same species of fish, such as herrings, the relation between the thickness and length of the head to the gill-bone is usually one to three. For the purpose of dressing such fish the operating members are adjusted so that the distance of the plate 9 from the fish head supporting plates 25 is always about one third of the distance of the plate 8 from the gill-bone behind which the fish is to be decapitated. In order to prevent rearward deviation of the fish head when sliding on the plate 8 the latter is moved slightly in the direction of travel of the conveyor 3. The swinging movement of the arm 14 above mentioned may satisfy this requirement.

The modified construction illustrated in Figs. 4 and 5 operates fundamentally in the same manner as the device just described. However, instead of being pushed against the fish heads, the adjusting member of the modified construction is adapted to pull the fish head end foremost.

The spring 10 is adapted to pull the arm 14 towards the conveyor 3 and the plate 8 is replaced by a vertical plate 29 the lower edge of which is inclined rearwardly. The arm 14 has a link 31 which is pivoted to a pin 30 and yields upwardly and carries the plate 29. The member 11 has a pin 22 for swinging the arm 14 outwardly, i. e. for retracting it from the conveyor 3. The roller 27 is journalled on the rear arm of the lever 12. When the head of a fish is moved beneath the lower edge of the plate 29 the link 31 yields upwardly. Before that a cam 26 (Fig. 1) has moved the roller 27 outwardly so that the member 11 with the pin 22 has allowed the plate 29 to be moved into a predetermined position (dash and dotted) relative to the conveyor 3. Thereafter the cam 26 allows the roller 27 to move inwardly. Then the spring 23 swings the lever 20 in the manner mentioned above, so that the plate 9 is moved down onto the head of the fish. Simultaneously, the roller 18 is moved inwardly by the bevelled rear end of the lever 20, so that the pin 22 will pull the plate 29 and thereby also the fish outwardly. This proceeds until the plate 9 has hit the fish head and been arrested thereby whereafter the spring cannot swing the lever 20 and, consequently, nor the lever 12 further. Thus, by suitable adjustment of the different members the fish can also, when using the construction now described, be adjusted longitudinally, so that the cutter 5 will hit the fish close behind its gill-bone. In order to make the lower edge of the plate 29 hit the fish at a correct distance from its head end the fish should first be displaced longitudinally against the plate 6, for instance, by means of a jet of water.

The modified construction just described may be made still more simple by substituting the plate 29 or a peripherally grooved roller for the plate 9 on the arm 24. The said substituted plate or roller may then serve as a gage as well as a member for adjustment of the longitudinal position of the fish. In such case, the lever 20 is pivoted to swing vertically as well as longitudinally of the conveyor pockets 4. For that purpose the pivot 21 of the lever 20 may be journalled rotatably in a vertical pin. The rear end of the lever 20 may be provided with a roller which under the influence of a spring will incessantly bear upon a bevelled race in such manner that the plate 29 is swung out from the conveyor 3 simultaneously as it is swung upwardly. By adjustment of the rolling race the relative velocities of the upward and lateral movements of the plate can be adjusted as desired.

In operation of this modified device, the plate 29 is urged upwards by the introduction of the fish head below same. As previously mentioned, the plate 29 is thereby swung outwardly, and pulls the fish longitudinally into a position that is defined by the upward movement of the plate, i. e. by the thickness of the fish's head. The plate 29 at its lower edge should suitably have a flange grooved at its lower side in the direction of movement of the conveyor 3, so that a relatively wide bearing surface will be obtained.

In the construction shown in Fig. 6 the upper side of the plate 9 is step-like to form abutments 41 at different levels, or said side may incline relative to the level of movement of the plate 8. A shoulder 40 on the horizontally movable plate 8 will hit the abutments 41 or said inclined surface. Thereby the movement of the plate 8 towards the conveyor 3 is limited by the abutments 41 or said inclined surface depending on the vertical position of the plate 9, i. e. depending on the thickness of the head of the fish. In this construction the movements of the gage plate 9 may be controlled either by the cams 26 and a spring that urges the plate downwards against the fish, or said plate may, as mentioned above, be lifted yieldingly by the fish head introduced below same. The adjusting plate 8 moves independently of the gage plate 9 inasmuch as it is moved by a spring towards abutments or the like of the plate 9 after the latter has occupied a position defined by the thickness of the head of the fish. Thus the lever 12 should be actuated separately by the cams 26 or by other controlling means and be moved by a spring inwardly towards the conveyor 3.

Figure 7:
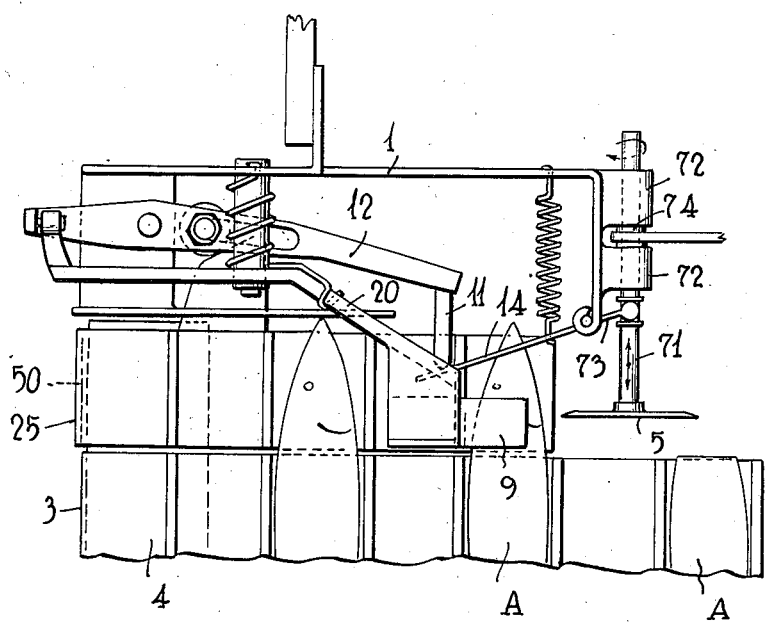
Fig. 7 is a plan view of a modification of the embodiment shown in Fig. 1.

Alternatively, the gage and the adjusting member may be rigidly interconnected. Thus the plates 8 and 9, as shown in Figs. 1 and 2, may together form an angular plate which is moved obliquely down and inwardly towards the conveyor 3 until the horizontal flange of the plate bears on the uppermost compact portion of the head of the fish. Simultaneously, the vertical flange will perform a displacing longitudinal movement of the fish until the head of the fish arrests the vertical movement of the plate as mentioned above. By adjustment of the oblique direction of movement of the said angular plate the device can be accommodated in a simple manner to different species of fish having different head shapes. The cams 26 or control means equivalent thereto may be arranged directly on the conveyor 3. Instead of conveying the fish transversely they may be conveyed longitudinally if the adjusting means are modified accordingly. With some species of fish the gage may coact with other portions than its head, e. g. a portion of the fish at some distance behind the head. Instead of adjusting the position of the fish relative to certain dressing members, the positions of said members, such as members for decapitating, may be adjusted in dependence on the thickness of the different fishes at their heads or another part. Thus, as shown in Fig. 7, the cutter 5 is mounted on a spindle 71 which is rotatably and slidably journalled in bearings 72 and has a driving pulley 74. The arm 14 has a rear extension 73 by means of which the spindle 71 is displaced axially in dependence of the movements of the arm 14. Thus, when gaging a relatively small fish, for example, the plate 9 will move downwardly considerably, and consequently the arm 73 retracts the cutter 5 considerably so that it will hit the fish head at the desired relatively small distance from its snout. The arm 14 and belt 50 are spaced apart sufficiently to allow the movement of the fish transversely beneath said arm.

I claim:

1. In a device for dressing fish, a fish conveyor, a fish dressing member, a gage having a part located in the path of movement of the fish on the conveyor and being yieldingly movable transversely to the fish resting on said conveyor, said gage also having a part movable longitudinally of the fish, means for moving said longitudinally movable part in accordance with the movement of the transversely movable part to displace the fish longitudinally into a position relative to said dressing member, depending on the extent of transverse displacement imparted to the transversely movable part of the gage by the fish.

2. In a device for dressing fish, a conveyor for advancing the fish transversely, a cutter located at one side of said conveyor for decapitating the fish advanced by said conveyor, a gage yieldingly movable transversely to the fish resting on said conveyor, an adjusting member for longitudinal displacement of the fish transversely to the path of travel of said conveyor, and means operably interconnecting said adjusting member and said gage.

3. In a device for dressing fish, a fish conveyor, a fish dressing member, a gage yieldingly movable transversely to the fish resting on said conveyor, an adjusting member for longitudinal displacement of the fish relative to said dressing member in dependence of said transverse movements of said gage, a lever carrying said gage, another lever carrying said adjusting member, said levers being operably interconnected to move said adjusting member materially faster than said gage.

4. In a device for dressing fish, a conveyor for advancing the fish transversely, a fish dressing member, a gage yieldingly movable transversely to the fish resting on said conveyor, an adjusting member operative at one side of said conveyor and being movable transversely to the path of travel of said conveyor for longitudinal displacement of the fish, means operably interconnecting said adjusting member and said gage imparting to said adjusting member a component of movement in the direction of travel of said conveyor.

5. In a device for dressing fish, a conveyor for advancing the fish transversely, a fish dressing member, a gage yieldingly movable transversely to the fish resting on said conveyor, an adjusting member for longitudinal displacement of the fish relative to said dressing member in dependence of the transverse movements of said gage, and a plurality of cams movable in succession in the direction of travel of said conveyor and at the same speed as said conveyor periodically to retract said adjusting member from said conveyor and thereafter to permit said adjusting member yieldingly to move towards said conveyor on driving said gage.

6. In a device for dressing fish, a conveyor for advancing the fish transversely, fish dressing means, a stationary abutment arranged longitudinally of said conveyor for preliminary adjustment of the heads of the fish transversely to said conveyor, a mechanism arranged at one side of said conveyor between said abutment and said dressing means for further adjustment of the longitudinal position of the fish relative to said dressing means, said mechanism comprising a gage, an adjusting member and controlling means, said gage being operably connected to said adjusting member and being movable transversely to the fish resting on said conveyor, said controlling means being adapted periodically to retain said adjusting member at a slightly greater distance from said conveyor than said abutment and then to allow yielding movement of said adjusting member towards said conveyor.

7. In a device for dressing fish, a fish conveyor, a fish dressing member, a gage yieldingly movable transversely to the fish resting on said conveyor, an adjusting member for longitudinal displacement of the fish relative to said dressing member, said gage and said adjusting member being operably and adjustably interconnected to obtain the desired relation of movements.

8. In a device for dressing fish, a fish conveyor, a fish dressing member, a gage yieldingly movable transversely to the fish resting on said conveyor, an adjusting member for relative longitudinal displacement of the fish and said dressing member, an abutment portion on said gage, a shoulder on said adjusting member adapted to coact with said abutment portion, and yielding means for moving said adjusting member to make its shoulder bear against said abutment portion, said abutment portion being adapted to arrest the advancement of said adjusting member in a position dependent on the transversal distance of said gage from said conveyor.

9. The method of dressing fish, comprising moving a gage transversely to a fish to gage its thickness, and adjusting the relative positions of said fish and a fish-dressing member longitudinally of the fish in accordance with the gaged thickness of said fish.

10. The method of dressing fish comprising moving a gage transversely to a fish to gage its thickness, and adjusting the relative positions of the fish and a fish-dressing member relative to one another longitudinally of the fish in dependence on the extent of the transverse movement of said gage.

11. The method of dressing fish comprising moving a gage transversely to a fish to gage its thickness, and transferring said transverse movement to the fish to displace the fish longitudinally relative to a fish-dressing member.

12. The method of dressing fish comprising a gage transversely to a fish to gage its thickness, and transferring the transverse movement to a fish-dressing member to displace said member longitudinally relative to the fish.

13. The method of dressing fish comprising moving a gage transversely to a fish to gage its thickness, and transferring the transverse movement of said gage to the fish to displace the fish longitudinally into a position in which a head cutter is operable to decapitate the fish close behind its gills.

14. The method of dressing fish comprising moving a gage transversely to a fish to gage its thickness, and transferring the transverse movement of said gage to a head cutter to displace said cutter longitudinally of the fish into an operative position close behind the gills of the fish.

15. The method of dressing fish comprising moving a fish past a gage to displace the gage transversely to the fish in dependence on the size of the fish, and adjusting the relative positions of the fish and a fish-dressing member longitudinally of the fish in dependence on the displacement of said gage transversely of said fish.

16. In a device for dressing fish, a fish conveyor, a fish-dressing member, a gage movable transversely to the fish supported by said conveyor, and means for adjusting the relative longitudinal positions of the fish and said dressing member in a definite relationship to the position of said gage transversely relative to the fish.

17. In a device for dressing fish, a fish conveyor, a fish-dressing member, a gage movable transversely to the fish supported by said conveyor, means for effecting relative displacement of the fish and said dressing member longitudinally of the fish, and means operably interconnecting said gage and said displacement means to cause said gage to move transversely to the fish simultaneously with the movement of said displacement member.

18. In a device for dressing fish, a fish conveyor, a fish-dressing member, a gage movable transversely to the fish supported by said conveyor, a member for relative displacement of the fish and said dressing member longitudinally of the fish, yielding means for moving said gage towards said conveyor, and means positively and operably interconnecting said displacement member and said gage to cause said gage to move transversely to the fish simultaneously with the movement of said displacement member.

19. In a device for dressing fish, a fish conveyor, a fish dressing member, a gage yieldingly movable transversely to the fish resting on said conveyor, an adjusting member for longitudinal displacement of the fish relative to said dressing member, said gage and said adjusting member being operably interconnected to obtain the desired relation of movements.

PAUL DANIELSSON.

CERTIFICATE OF CORRECTION.

Patent No. 2,245,330. June 10, 1941.

PAUL DANIELSSON.

It is hereby certified that error appears in the printed specification of the above numbered patent requiring correction as follows: Page 3, second column, line 13, claim 4, after the word "gage" insert --, and means for--; and that the said Letters Patent should be read with this correction therein that the same may conform to the record of the case in the Patent Office.

Signed and sealed this 12th day of August, A. D. 1941.

(Seal)

Henry Van Arsdale,
Acting Commissioner of Patents.